United States Patent [19]

Weinberger

[11] Patent Number: 4,463,439

[45] Date of Patent: Jul. 31, 1984

[54] SUM AND CARRY OUTPUTS WITH SHARED SUBFUNCTIONS

[75] Inventor: Arnold Weinberger, Poughkeepsie, N.Y.

[73] Assignee: International Business Machines Corporation, Armonk, N.Y.

[21] Appl. No.: 379,371

[22] Filed: May 17, 1982

[51] Int. Cl.³ .............................................. G06F 7/50
[52] U.S. Cl. ................................................... 364/784
[58] Field of Search ............................... 364/784, 786

[56] References Cited

U.S. PATENT DOCUMENTS 2,899,133  8/1959  Tryon ................................... 364/784
3,548,182 12/1970  Pross ................................... 364/784
3,646,332  2/1972  Suzuki ................................. 364/784
4,369,500  1/1983  Fette ................................... 364/786

Primary Examiner—David H. Malzahn
Attorney, Agent, or Firm—James E. Murray

[57] ABSTRACT

Full adder stages in this adder are made up of two half adder stages that will produce either the true or complement of the sum as a bundle of subfunction signals that can be shared between the sum and carry outputs of the full adder stage. The half adder stages come in a variety of forms to accommodate both true, both complement or one true and one complement input combinations to the stage.

5 Claims, 14 Drawing Figures

SUM AND CARRY OUTPUTS WITH SHARED SUBFUNCTIONS

BACKGROUND OF THE INVENTION

The present invention relates to binary full adder stages and to their fabrication from two binary half adder stages which receives two input signals and generates a partial sum and a partial carry therefrom.

It is well known that binary full adder stages are built up of two half adder stages that each receive two inputs and perform an Exclusive OR function thereon to generate a partial sum and an AND function thereon to generate a partial carry. It is suggested in Morgan et al, U.S. Pat. No. 3,074,639 that using a special Exclusive OR network in each half adder stage, a full adder stage can be implemented in two logic delays. However, such special purpose Exclusive OR circuits are not always available in the circuit family being employed to implement the adder and are generally slower than standard logic blocks in performing the half adder function. In addition, in large scale integration (LSI) custom designed chips are expensive and need high usage to be justified.

Bundling is a logic design technique to save logic circuits. This technique has been employed in adders as evidenced by an article entitled "Decimal Adder Carry Circuits", appearing on page 382 of the August 1969 issue of the IBM Technical Disclosure Bulletin.

DETAILED DESCRIPTION OF THE INVENTION

In accordance with the present invention, bundling is employed in both half adder stages of a full adder stage to generate the full adder function in two logic delays using only four standard logic blocks. The sum outputs of both adder stages are left as a bundle of two subfunction signals. One of these subfunction signals of the sum output of each of the half adder stages can then be shared to generate the carry signal of the full adder. Usually one of the sum and carry outputs of the full adder stages is the true while the other is the complement. To accommodate this, the half adder stages must come in at least two forms to generate the same signals from the variety of input phase combinations.

Therefore, it is an object of the present invention to provide a new full adder stage in adders.

It is another object of the present invention to provide full adder stages with a minimum of logic delays and logic blocks.

It is a further object of the present invention to provide half adder stages with bundled sum outputs that can be shared to generate the carry output for the full adder stage.

DESCRIPTION OF THE DRAWINGS

These and other objects of the invention can best be understood by reference to the accompanying drawings of one embodiment thereof, of which.

DETAILED DESCRIPTION

Figure 1:
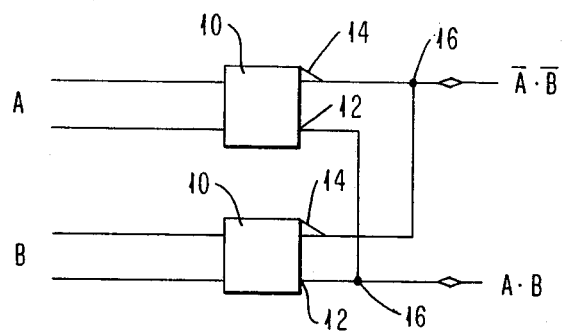
FIGS. 1 to 3 are logic diagrams of logic circuits employed in the present invention.
Figure 2:
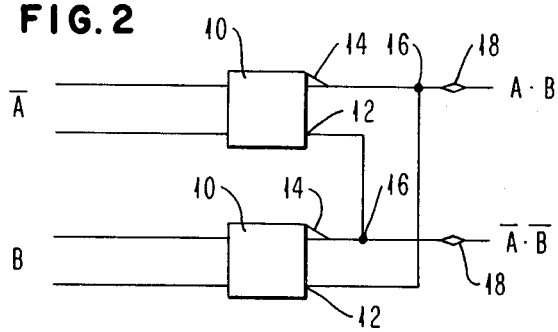

In FIGS. 1 and 2, multiple input OR gates 10 have true and complement (NOR and OR) outputs 12 and 14 respectively. The outputs are AND (collectors) dotted 16 and feed thru emitter follower circuits 18 to generate the product of the true and the product of the complement inputs. The collector dotting is different in FIGS. 1 and 2 to accommodate the phase differences of the input signals. Thus the same outputs can be obtained from both circuits irrespective of the fact that the inputs to one are both true while the inputs to the other are true and complement signals.

Figure 13:
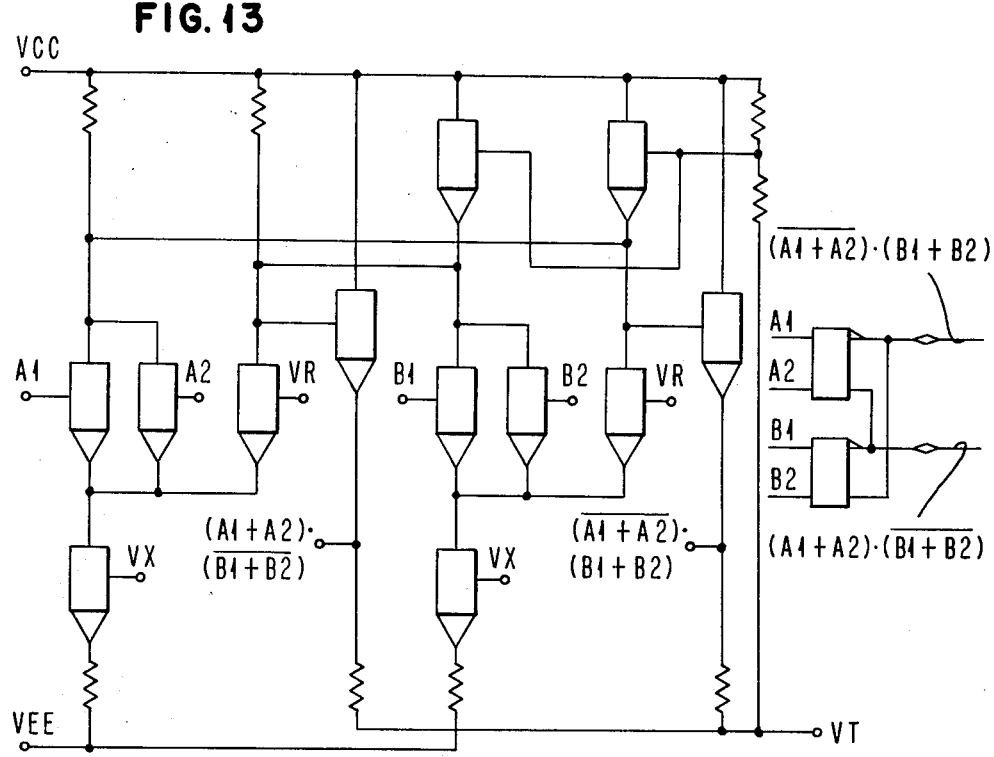
FIGS. 13 and 14 are circuit diagrams of current switch emitter follower circuits with collector dotting.
Figure 14:
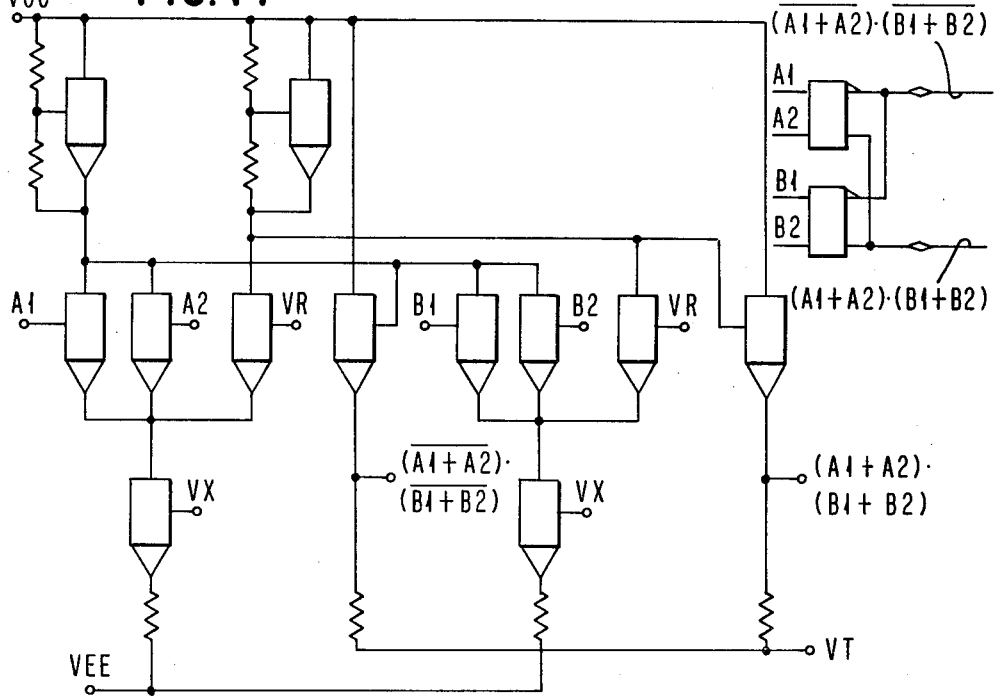

The type of circuits employed here are current switch emitter follower (CSEF) circuits. CSEF circuits are well known. Examples of CSEF circuits for performing the logic function illustrated in FIGS. 1 and 2 are shown in FIGS. 14 and 13 respectively. While CSEF circuits are used here, other circuit families such as transistor transistor (TTL) circuits can be used to obtain the advantages of the present invention.

Figure 3:
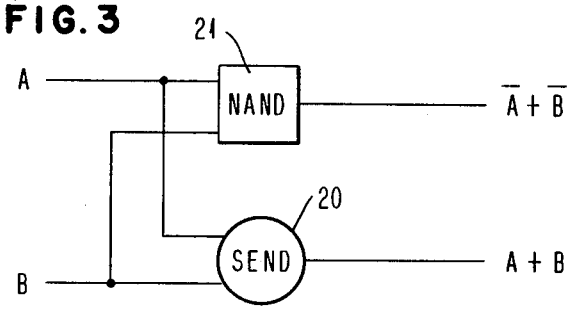

A common circuit in integrated circuits is what is referred to as a send circuit. A send circuit is an off the chip driver circuit which logically performs an OR function of its inputs. As shown in FIG. 3, a send circuit 20 can be combined with a logical NAND circuit 21 to generate the sum of the trues and the sum of the complements.

Figure 5:
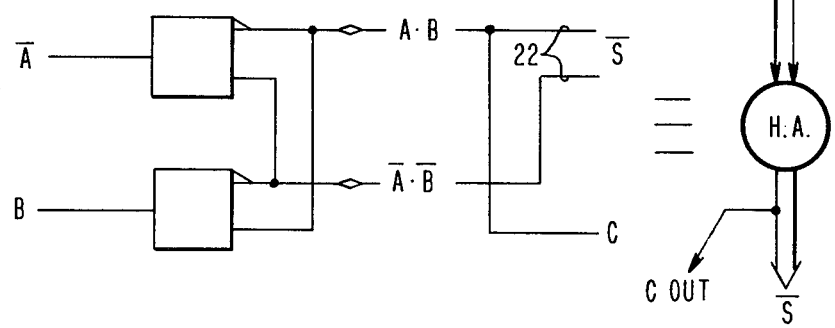
FIGS. 4 to 6 are logic diagrams of half adders in accordance with the present invention.
Figure 4:
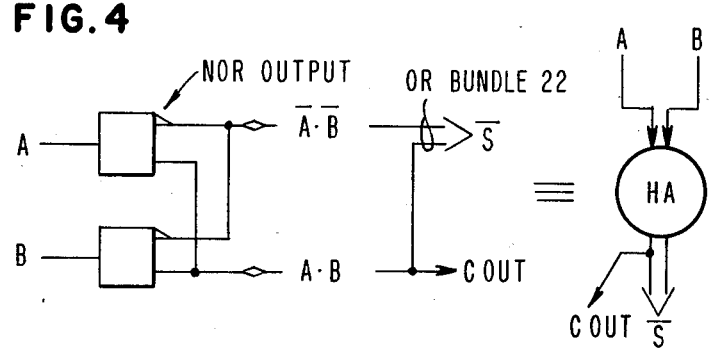
Figure 6:
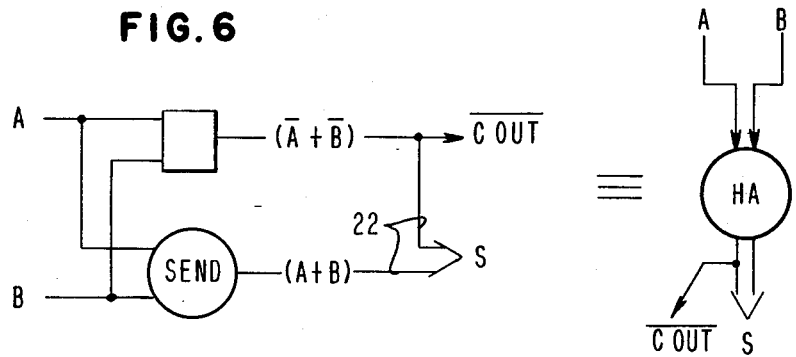
Figure 7:
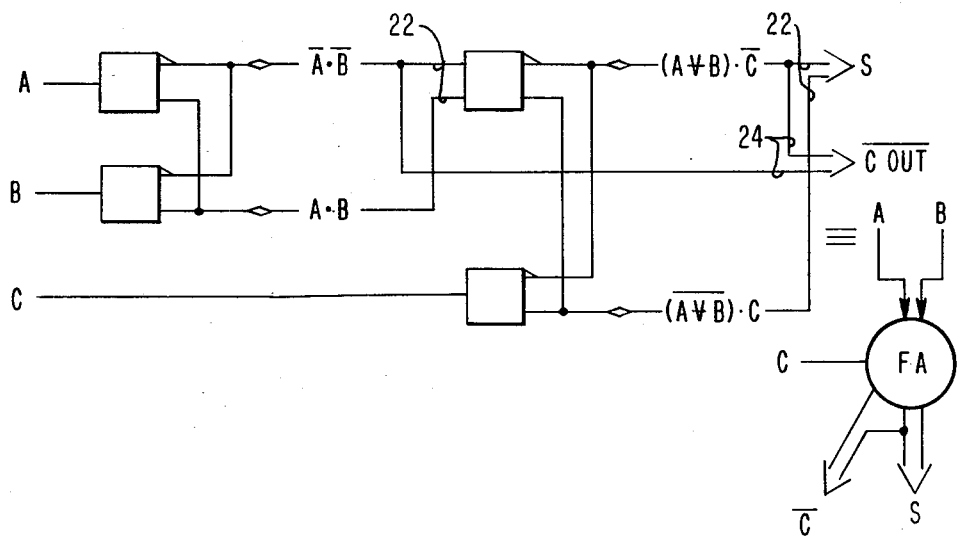
FIGS. 7 to 11 are logic diagrams of full adders in accordance with the present invention.
Figure 8:
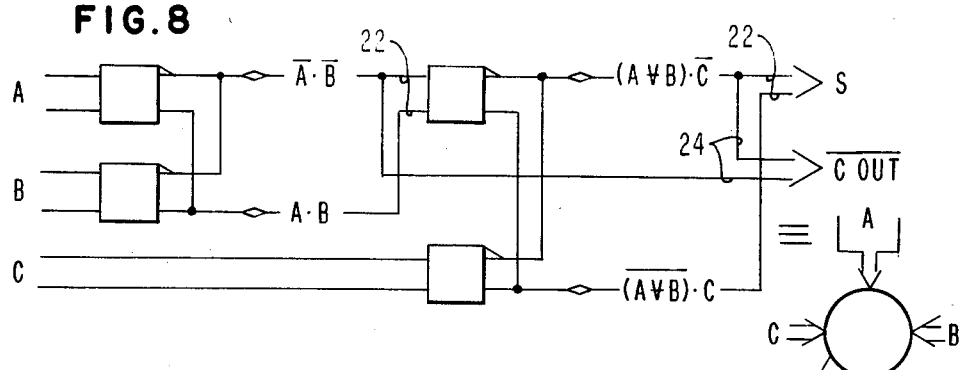
Figure 9:
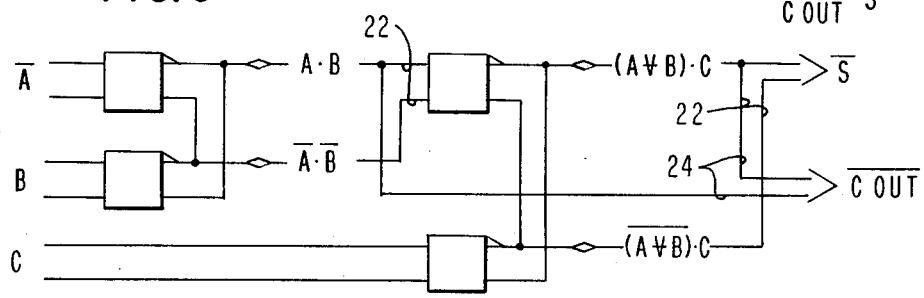
Figure 10:
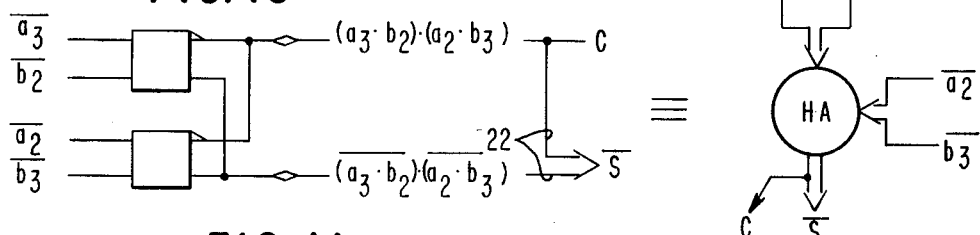
Figure 11:
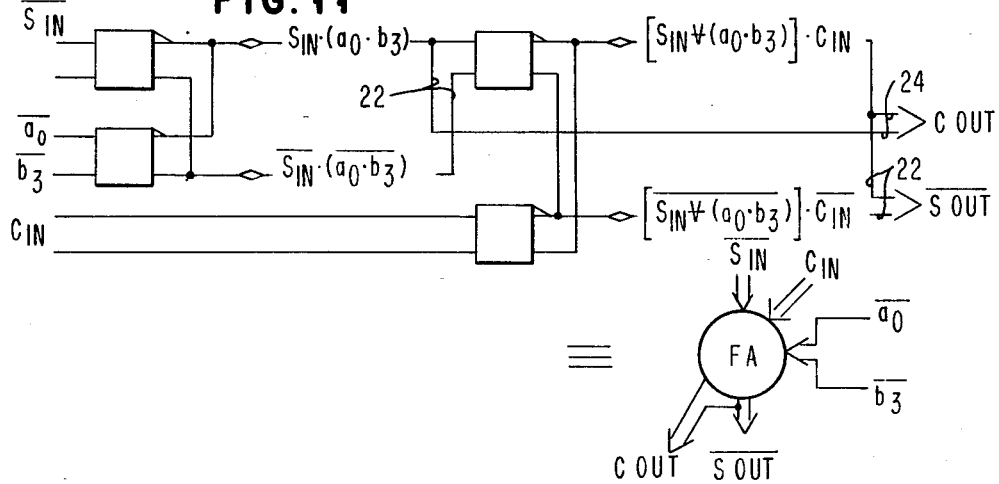

In accordance with the present invention, each of the circuits of FIGS. 1 to 3 along with other circuits can be used as partial adder stages that can be combined with another such partial adder stage to generate a full adder stage. As shown in FIGS. 4, 5 and 6, the outputs are left as a bundle 22 in providing the partial sum S or complement of the partial sum $\bar{S}$ output. Now one of the outputs can be used as the carry C or complement of the carry $\bar{C}$ output when two of such half adders are combined as shown in FIGS. 7 to 11, one signal output from each sum output is shared to generate the full carry bundle C OUT or $\bar{C}$ OUT 24 for the full adder.

As can be seen, each of the adder stages is made up to 4 logic blocks arranged in two logic delays.

Figure 12:
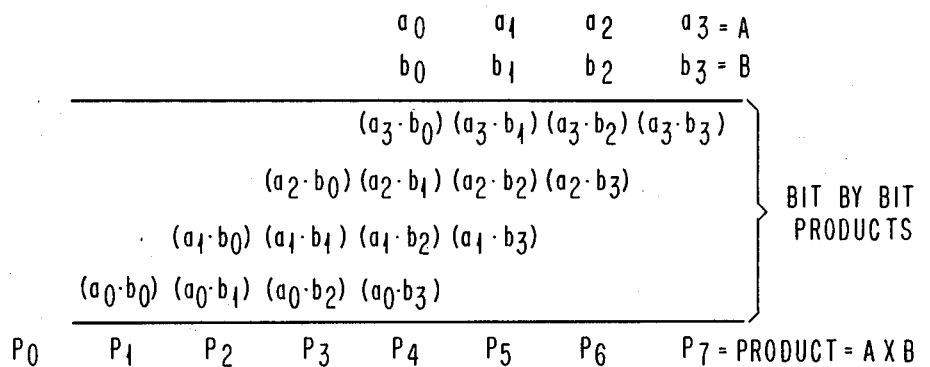
FIG. 12 is a logic diagram of a 4×4 multiplier with a carry save adder tree using half adders and full adders in accordance with the present invention.
Figure 12:
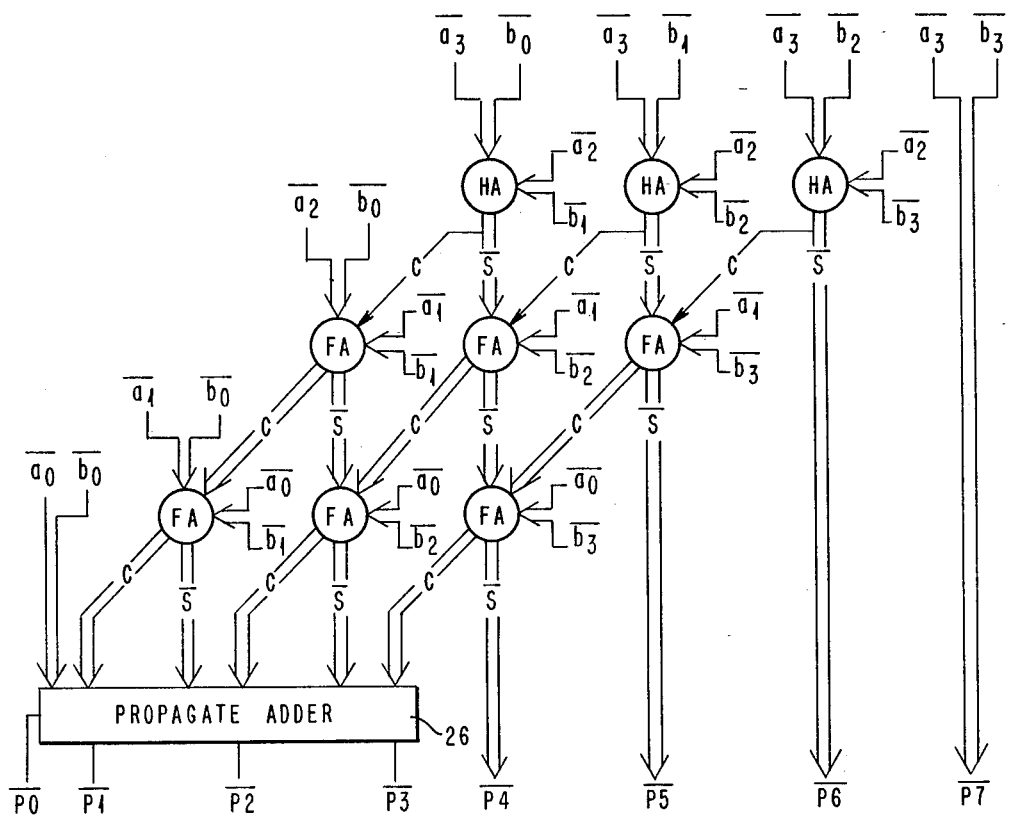

In FIG. 12, the 4×4 multiplier with the carry save adder tree uses the half and full adders described above. The tree accepts 4 bits each of the multiplicand and multiplier to produce the low order 4 bit product directly. The high order carry and sum bits are combined in a known propagate adder 26 to produce the high order 4 bit product. No additional gating is needed to produce the individual products of one multiplier by one multiplicand bit. Instead the bit products are implied by appropriate bundling of the input bits i.e. $a_i \cdot b_j$ enters in complement form as an OR bundle $a_i + b_j$.

Above I have described one embodiment of my invention. Therefore it should be understood that many modifications and changes can be made in the illustrated embodiments without departing from the spirit and scope of the invention as represented in the attached claims.

Having thus described my invention, what I claim as new, and desire to secure by Letters Patent is:

1. An adder of the type where sum and carry functions are produced by a plurality of individual full adder stages, which comprise:
   (a) first half adder type means for producing a partial sum as a bundle of subfunction signals one being a subfunction of the trues and the other a subfunction of the complements of two inputs when those inputs are both true or both complements,
   (b) second half adder type means for producing a partial sum as a bundle of subfunction signals one being said subfunction of the trues and the other said subfunction of the complements of said two inputs when those inputs are not both true or both complement,
   (c) full adder stage means including one of said half adder type means as a first half adder stage said full adder stage means generating full sum functions as a bundle of subfunction signals and full carry functions as a bundle of subfunction signals wherein the full carry functions include a subfunction signal of the other of said half adder type means and subfunction signal of said full sum function bundle, and
   (d) means for transmitting said full sum and carry functions of an adder stage each as a bundle of such subfunction signals to other full adder stages.

2. The adder of claim 1 wherein all half adder type means in said full adder stage means include two standard logic blocks with their outputs cross connected to generate subfunctions.

3. The adder of claim 2 wherein the input of one of said standard logic blocks in the first half adder type means of said full adder stage means is connected to the partial sum bundle of said other half adder stages means to receive the subfunction signals of said other half adder type means and the input to the other of said standard logic blocks in said first half adder type means receives a carry signal from another full adder stage means.

4. The adder of claim 2 wherein said half adder type means generate the product of the trues of the inputs and the product of the complement of the inputs as the subfunction signals in said partial sum output bundle.

5. The adder of claim 2 wherein said standard logic blocks perform an OR and a NOR function.

* * * * *